United States Patent
Boldman et al.

(10) Patent No.: US 7,159,021 B2
(45) Date of Patent: Jan. 2, 2007

(54) SYSTEM AND METHOD FOR TESTING PEER-TO-PEER NETWORK APPLICATIONS

(75) Inventors: James R. Boldman, Duvall, WA (US); Upshur W. Parks, Bothell, WA (US); Ramakrishnan L. Peruvemba, Redmond, WA (US); Kishore J. Prakash, Redmond, WA (US); Jonathan T. Wheeler, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 10/183,150

(22) Filed: Jun. 27, 2002

(65) Prior Publication Data

US 2004/0003068 A1 Jan. 1, 2004

(51) Int. Cl.
*G06F 15/173* (2006.01)
*G06F 15/177* (2006.01)
*G06F 11/00* (2006.01)
*G06F 9/44* (2006.01)
*G01R 31/28* (2006.01)

(52) U.S. Cl. ............... 709/223; 709/220; 709/224; 714/38; 714/724; 717/101

(58) Field of Classification Search ............ None
See application file for complete search history.

(56) References Cited

U.S. PATENT DOCUMENTS

| 5,233,611 | A | 8/1993 | Triantafyllos et al. |
| 6,067,639 | A | 5/2000 | Rodrigues et al. |
| 6,408,403 | B1 | 6/2002 | Rodrigues et al. |
| 6,804,709 | B1 * | 10/2004 | Manjure et al. ............ 709/220 |

* cited by examiner

*Primary Examiner*—Bunjob Jaroenchonwanit
*Assistant Examiner*—Philip Lee
(74) *Attorney, Agent, or Firm*—Marshall, Gerstein & Borun LLP

(57) ABSTRACT

A test framework for testing peer-to-peer applications allocates a test case manager and a plurality of distributed test units for each test case, which has a sequence of actions each to be performed by one of the test units. To enable the test units to perform the test case actions, the test case manager loads dynamic link library files (DDLs) containing the test case to each test unit, and creates on each test unit a test object that can be remotely activated using an object-remoting framework. To execute the test case, the test case manager goes through the sequence of test case actions. For each action, the test case manager calls the test object on a corresponding test unit to perform the action. In this way, the test case manager directs the test units to carry out the test case actions. The results of the test case actions are logged by the distributed test units and then collected for analysis and diagnosis.

23 Claims, 4 Drawing Sheets

TEST RUN 154

160
☐ By Sub component
  ☐ Networking
    ⊞ PeerNetworking
    ⊞ Triage
    ☐ Universal Plug & Play
      ⊞ Device Host Dehydrator
      ☐ SSDP
        ☐ Security
          ├ SSDP_PROT_000 ...
          └ SSDP_PROT_001...
        ☐ Tools
          ☐ BVT
          ├── UPnPvbt-all: ...

Number of Machines 166
162  2  ▲▼

SSDP_PROT_000: SSDP protocol
-Send Headers nam not followed
by ";"
Description: Send Headers name
not followed by ":"
Procedure: send a NOTIFY
ssdp:alive ssdp packet to port 1900
of teh ssdpsrv with header name
not followed by teh ":" HOST
239.255.255.250 .....

Specific Machines
☐ ANTI-MATTER
☐ BOGYS-DEV2
☐ PEERNET19
...
...

| Select | TestCase FriendlyID | TestCast ID | No. of SUTS | Specific SUTs |
|---|---|---|---|---|
|  | UPnPbvt-all | 8380f0d5 | 1 | PeterJ5 |
| ▶ | SSRP-PROT_000 | c76bd30b | 2 | PEERNET2 |
|  | ... ... |  |  |  |

170
168

Add to Batch

FIG. 4

| Refresh Test Listing | | Clear Batch | Save Batch | Start Batch |

174  172

SYSTEM AND METHOD FOR TESTING PEER-TO-PEER NETWORK APPLICATIONS

TECHNICAL FIELD

This invention relates generally to computer networks, and more particularly to a test framework for testing peer-to-peer network applications.

BACKGROUND OF THE INVENTION

With the rapid advancements in computer networking technologies, peer-to-peer applications are becoming more and more popular. In the peer-to-peer model, any client is also a server. Peer-to-peer applications enable computer users to find each other, share files, communicate and collaborate directly for services such as chat room messaging, without the aid of dedicated network servers and services.

One of the challenges in developing peer-to-peer applications is that a peer-to-peer operation requires the cooperation of multiple computers distributed over the network, and extra development efforts are required to ensure the scalability of the application. A peer-to-peer application that scales well has a low cost (in terms of computer and network resource consumption) per additional participant in the peer-to-peer group, while the cost per additional participant of an application with poor scalability may grow rapidly to an unacceptably high level as the number of participants increases. Because peer-to-peer applications are difficult to model, it is often necessary to test them in a controlled environment on a fairly large scale to see whether they scale well. It is, however, not an easy task to properly test peer-to-peer applications, as it requires synchronizing automated test case execution across a distributed set of clients. Existing network test systems are typically unsuitable for testing peer-to-peer applications on a large scale. Many of them are designed to test applications running independently on client machines, and others are designed for testing applications running in client-server environments. Accordingly, what is needed is a new test framework that enables efficient and well-controlled testing of peer-to-peer applications on a large scale.

SUMMARY OF THE INVENTION

In view of the foregoing, the present invention provides a test framework for testing peer-to-peer applications in an organized and controlled manner that is capable of running a large number of test cases concurrently. In the test framework of the invention, each test case is assigned to a test case manager and a plurality of test units distributed on a peer-to-peer network. The test case includes a sequence of actions, each to be performed by one of the test units. To enable the test units to execute the test case, the test case manager loads a set of dynamic link library files (DDLs) for performing actions of the test case to each test unit, and creates on the test unit a test object that can be remotely activated and called using an object-remoting framework. To execute the test case, the test case manager goes through the sequence of actions of test case. For each action, the test case manager identifies a corresponding test unit that is to perform that action, and calls the test object on that test unit to perform the action. In this way, the test case manager directs the test units to execute the test case. The results of the test case actions are logged by the distributed test units and collected for analysis and diagnosis.

BRIEF DESCRIPTION OF THE DRAWINGS

FIG. 4 is a schematic diagram showing a user-interface page for user selection of test cases to be executes using the test system of FIG. 3.

DETAIL DESCRIPTION OF THE INVENTION

Figure 1:
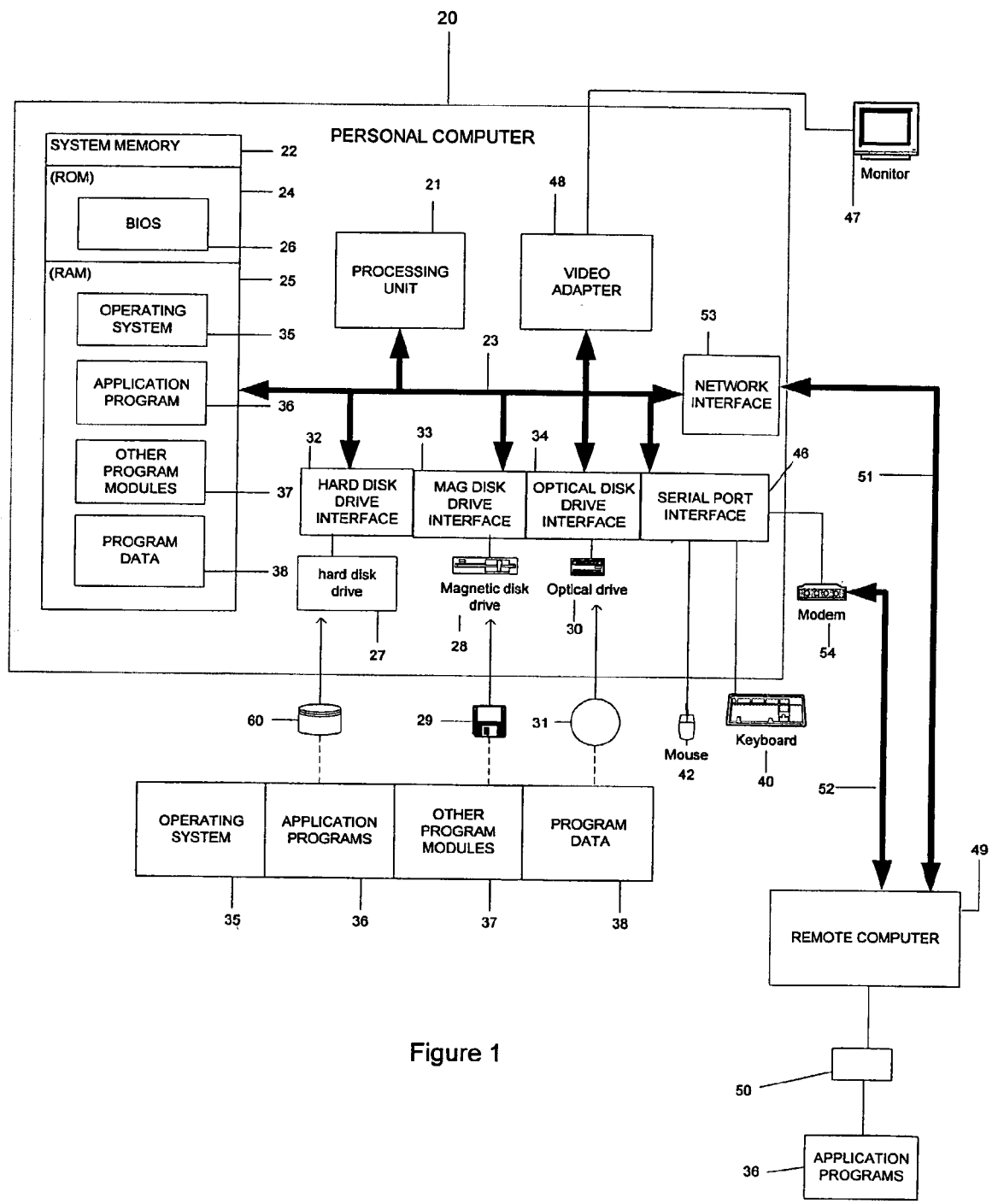
FIG. 1 is a block diagram generally illustrating an exemplary computer system on which components of a test framework in accordance with the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used for implementing components of an exemplary system of the invention, and the invention will be described in greater detail with reference to FIGS. 2–4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively.

The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
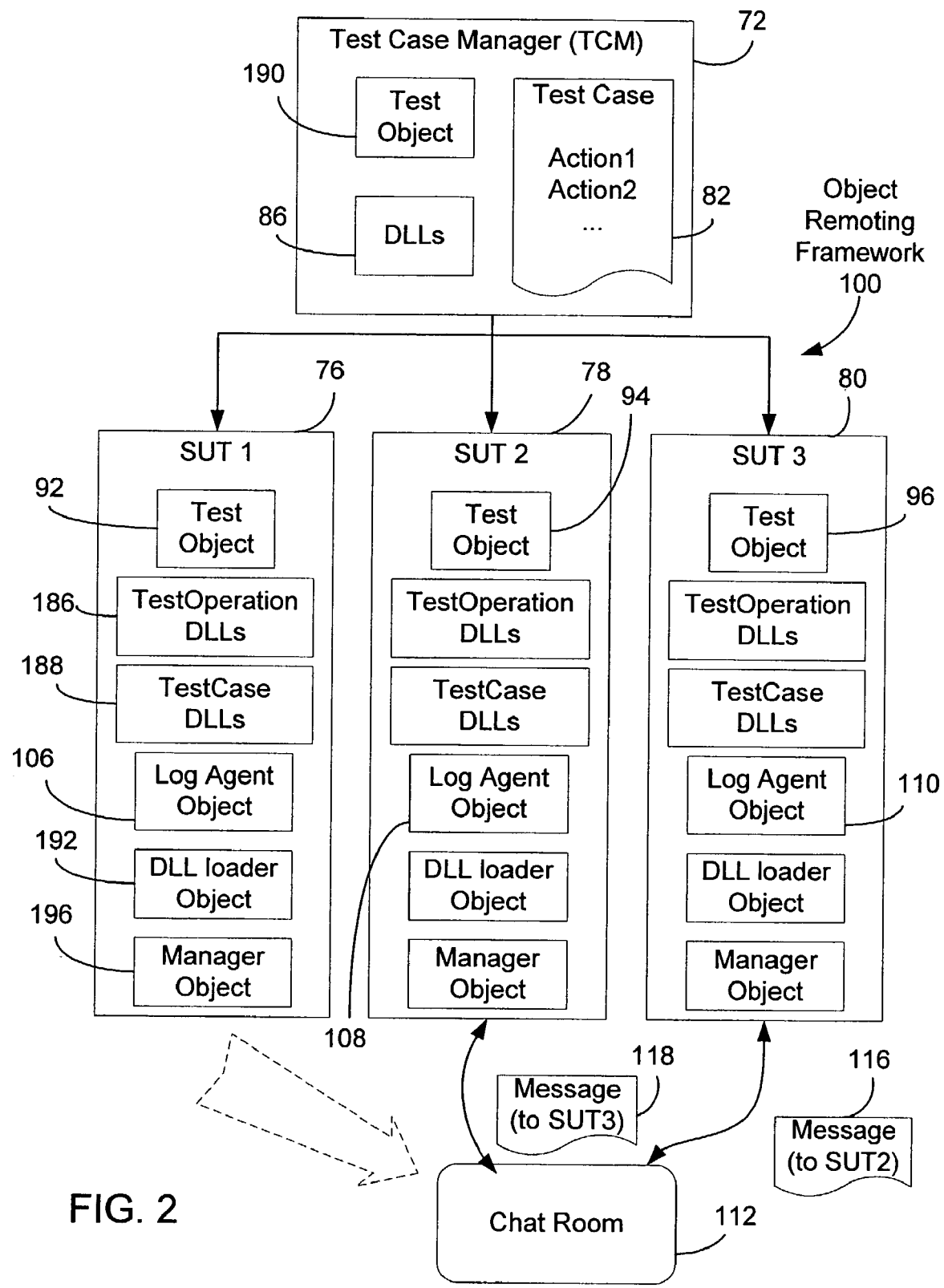
FIG. 2 is a schematic diagram showing a test case manager and a plurality of test units selected for testing one or more test cases designed for testing operations of peer-to-peer applications.

Referring now to FIG. 2, the present invention is directed to a new test framework that can be used to test peer-to-peer applications that involve coordinated actions by multiple computers in a distributed environment. The building block of this test framework, as illustrated in FIG. 2, is a combination of a test case manager (TCM) 72 and a plurality of test units that are hereinafter called "systems under test" or "SUTs". Each group of a test case manager and one or more SUTs may be used to run a single test case once or multiple times, or to run a suite of test cases. For simplicity of illustration, only three SUTs 76, 78, 80 are shown in FIG. 2, but it will be appreciated that there may be fewer or more SUTs assigned to each test case manager depending on the test cases to be executed. A test system may employ many such groups of test case manager and SUTs for testing different test cases concurrently, and the management of the test groups will be described in greater detail below.

For each test case designed for testing aspects of a peer-to-peer application, a test case manager and the required number of SUTs is selected for "enacting" the given test case. In this regard, each SUT may be viewed as an actor playing a role in a stage play, and the test case manager functions as a director that instructs each SUT to perform an action when it is the SUT's turn to act. In keeping with this analogy, each test case 82 includes a sequence of actions, each to be performed by one of the SUTs as part of a peer-to-peer application operation. The test case manager 72 controls the execution of the test case by going through the sequence of actions and, for each action in the sequence, identifying a SUT that is to perform that action, and instructing that SUT to perform the action. The results of the actions performed by the distributed SUTs are logged by log agents of the SUTs and collected for analysis and diagnosis purposes.

To enable the test case manager 72 and SUTs 76, 78, and 80 to perform the actions in the test case 82, the test case manager is given the dynamic link library files (DLLs) 86 in which the test case actions are located. In this regard, test cases are written and compiled as DLLs. In other words, the DDLs for a test case contain the functions for performing the actions in the test case. The test harness loads the DLLs into the memories of the machines participating in the testing and executes the test cases contained within the DLLs. This is different than conventional test harnesses, which require the test cases to be contained in an executable or script file. The DLLs 86 may contain multiple test cases for a particular peer-to-peer application feature. The test case manager also receives test cases that are to be executed using the SUTs assigned to it.

Before the execution of the test cases, the DLLs 86 required for the test operations and for the particular test cases are loaded onto each of the SUTs. Moreover, a test object 92, 94, or 96 is created on each of the SUTs 76, 78, 80 participating in the testing. This test object is remotely callable by the test case manager 72 by means of an object-remoting framework 100 implemented in the peerto-peer networking environment, such as one based on the .NET remoting technology of Microsoft Corporation. By calling the methods of the test object 92 of a SUT 76, the test case manager 72 can control that SUT to perform specific actions in the sequence of actions of the given test case 82.

Generally, the remote framework is responsible for activating remote objects. In a .NET remoting framework, the framework stores a list of all registered objects keyed on the object's URI. For a client to call a remote object, a proxy for the remote object is created on the client. When the client calls a method on the proxy, the method call is turned into a message that is transported over a channel for remoting to an application domain specified in a URL specified by the client in connection with the method call. This URL corresponds to the application domain where the remote object is hosted. When the call arrives at the server with that URL, the remoting framework uses the URI specified in the call to locate a reference to the object in an identity table. If the object reference is found, the framework activates the object if necessary and forwards the method call to the object. Two or more remote objects may share a remoting channel as they can be differentiated by their URIs.

In this regard, it will be appreciated that even though the test case manager's interaction with the SUTs for test case execution relies on the existence of an underlying object-remoting framework 100, the peer-to-peer application test framework of the invention is not limited to any particular object-remoting framework, and any suitable object-remoting technology may be used.

As mentioned above, each of the actions in the test case 82 is to be performed by one of the SUTs as part of an overall peer-to-peer process. During the execution of the test case, for each action in the sequence, the test case manager 72 identifies the SUT that is supposed to perform that action, and calls a method of the test object on that SUT to perform that particular action. Using the DLLs 86 loaded onto the SUT, the test object performs the specified action. After the SUT performs the action, the test case manager 72 moves on to the next action in the test case sequence, and instructs a corresponding SUT to perform that action. This controlled testing process continues until either all the distributed actions in the test case are performed or the testing has to be aborted due to errors or other reasons. In a preferred embodiment, for result logging purposes, each SUT 76, 78, or 80 has a log agent 106, 108, or 110. The results of performing an action by a SUT are logged by the log agent on that SUT, and the logged information can be transmitted to a main log database and combined with the test result information logged by the other machines involved in the test case.

By way of example, still referring to FIG. 2, the test case 82 may be directed to the operation of a chat room on a peer-to-peer network. In this scenario, one machine in the peer-to-peer network is requested to set up a chat room, and other peer machines will join the chat room and send messages to one another. The DLL functions required for executing actions in this test case include the following:

CreateRoom: creating a chat room.
JoinRoom: joining the chat room.
SendMessage: sending a message to the chat room.
ReceiveMessage: receiving a message from a machine that has joined the chat room.
DestroyRoom: taking down the chat room.
LeavingRoom: leaving the chat room.

The exemplary test case involves three peer entities N1, N2, N3, one of which will create a chat room and the other two will use the chat room to exchange messages. In particular, the test case involves the following sequence of distributed actions:

N1: CreateRoom
N2,N3: JoinRoom
N3: SendMessage (to N2)
N2: ReceiveMessage
N1: DestroyRoom
N2: SendMessage In this particular test case, N2 should be able to receive the message sent by N3, but an error should be identified when N2 tries to send a message after the chat room has been destroyed.

To carry out this test case, the test case manager 72 and the three SUTs 76, 78, 80 (corresponding to N1, N2, and N3, respectively) are selected. The test case manager 72 is given the test case 82. Test objects 92, 94, and 96 are created on the respective SUTs 76, 78, 80, and the required DDLs 86 for each SUT to play its part in the test case are loaded to that SUT. After the execution of the test case has started, the test case manager 72 first calls the test object 92 of the SUT 76 (N1) to create a chat room 112. Thereafter, the test objects 94, 96 on the SUTs 78 and 80 are called to join the chat room set up by the first SUT 76. The SUT 80 (N3) is then told to send a message 116 to the SUT 78 (N2) via the chat room. The test case manager 72 then checks whether the SUT 78 has successfully received (by means of the ReceiveMessage DLL function) the message 116 sent by the SUT 80. The test case manager 72 then calls the test object 92 of the SUT 76 to destroy the chat room 112. Subsequently, the test case manager 72 calls the test object 94 of the SUT 78 to send a message 118 to the SUT 80 via the chat room. This concludes the test case.

Figure 3:
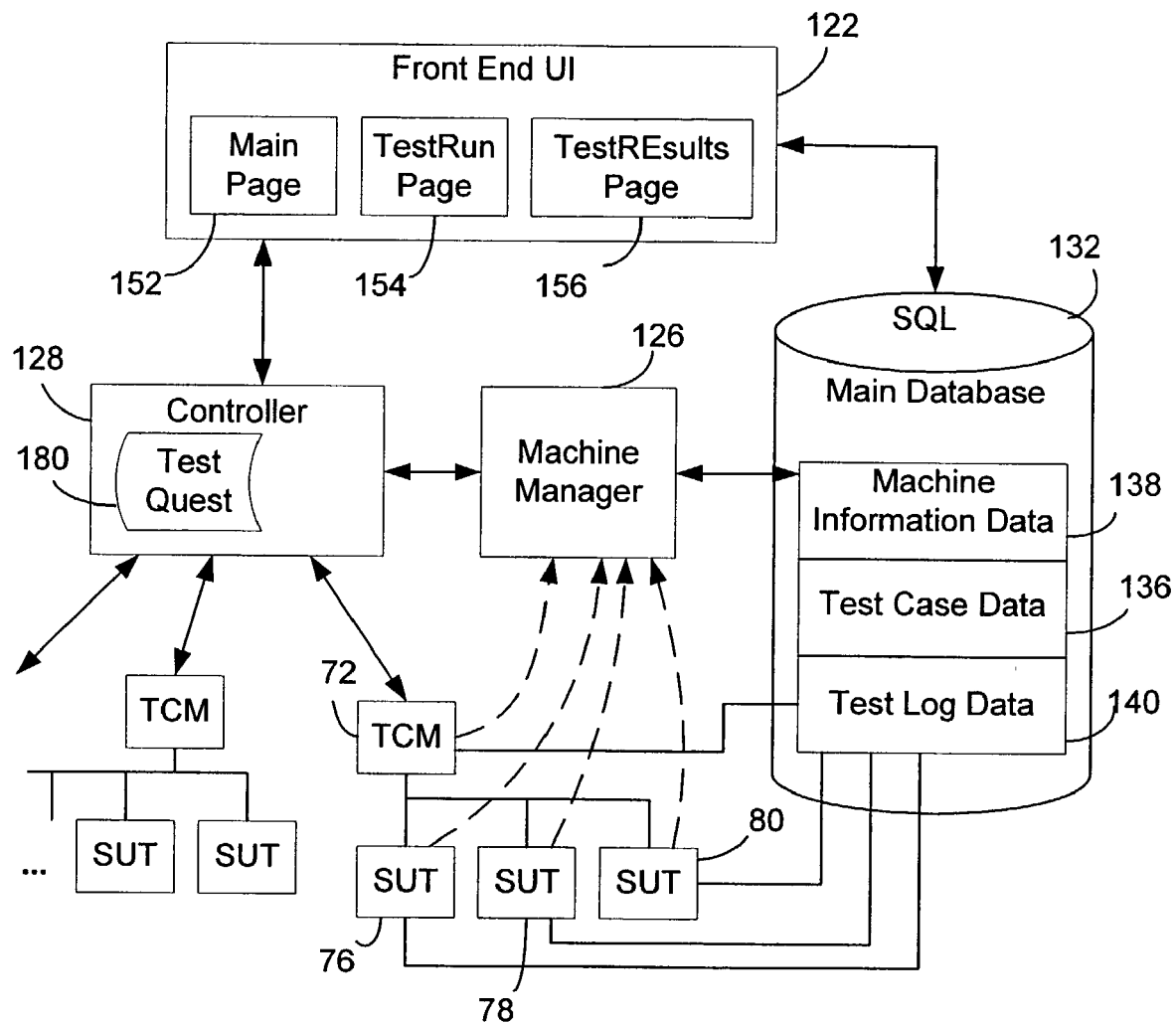
FIG. 3 is a schematic diagram showing an embodiment of a test system in accordance with the invention capable of testing multiple test cases concurrently.

FIG. 3 shows the architecture of an embodiment of a test system 120 for testing peer-to-peer applications in accordance with the invention. A shown in FIG. 3, this system includes a front end user interface (UI) 122, a machine manager 126 for managing test machines as they join and leave the test system, a controller 128 that functions as the control center of the system, a main database 132 that includes a test case database 136, a machine information database 138, and a log database 140 containing log data for test results, and a plurality of test case managers and SUTs associated with respective test case managers. The functions and operations of these components are described in greater detail below.

The front-end UI 122 component allows a user 150 to run a suite of test cases on a group of selected test machines and to view the status and results through querying a test status table maintained by the controller 128. In a preferred implementation, the front end UI includes three different web pages: Main, TestRun, and TestResults. The Main page 152 acts as the default web page and allows the user to navigate to the other two web pages. The TestRun web page 154 is where one would go to execute a test run.

As shown in FIG. 4, the TestRun web page 154 has separate input/display areas. The available test cases are displayed in a window 160 in a tree-list format. The user can navigate through the list and select the test cases to be tested. A test case description window 162 displays text describing a corresponding test case selected in the test case window 160. A "Number of Machines" box 166 allows the user to specify the number of SUTs to use for the test run. A "Specific Machines" window 168 allows the user to select specific machines to use in the test run. A case selection table 170 lists the test cases selected for the current run (i.e., test execution batch). Clicking the "Start Batch" button 172 on the menu bar 174 sends the data to the test execution table mentioned above so that controller can start the test. Returning to FIG. 3, the TestResults page 156 allows the user to view test statistics. It looks and operates much like the TestRun page in that it presents configurable criteria fields for the user to enter a query. The query fields include: SUT, TestBatchID, TestExecution-ID, Owner, Date, Component, Subcomponent, and Priority. Information about available test cases that the user can select to run is stored in the test case database 136 in the main database 132. In one implementation, the test case database 136 is a SQL database. For each test case, the following entries are stored:

Test case ID: a unique ID for the test case.
Area.
Component
Subcomponent
Test category: Acceptance/BVT/Functional/Stress.
Priority: priority of a test in each test category—e.g., levels 1–4.
Owner: owner of the test.
Title: test title.
Description: descriptive words regarding the purpose of the test.
Number of SUTs: the number of SUTs to be used. This may be a fixed number or 0 to indicate a random number of SUTs.
Dependency files: list of files required to run the test.
Test DLL name: name of the test DLL to be loaded to the SUTs.
Entry point: the function to be called to execute the test case.

The machine manager 126 is responsible for carrying out the initial registration of test machines, maintaining a list of available SUTs and a list of available test case manager (TCM) nodes. To that end, any new machine that wants to participate in the test operation as a test case manager or SUT first registers with the machine manager 126. The machine manager 126 has two modules for handling the registration operation: a test machine (i.e., SUT) registration module and a test case manager registration module. The test machine registration module keeps a list of physical machines available for the test and deleting them from the list if the user decides to unregister a machine, the machine fails, or the network connection breaks, etc. All incoming machines are required to register and each machine gets a unique PhysicalID. In one implemented embodiment, each test machine is limited to running only one instance of the SUT service. It is, however, not a limitation of the invention, and in an alternative embodiment each physical test machine may host one or more SUTs.

The test case manager registration module maintains the list of available test case managers (TCMs). There can be multiple test case managers available on the network, and each physical TCM machines can host several logical test case managers. As described above, the main purpose of the test case manager is to control and synchronize test case execution on the SUTs. In one implementation, the machine manager does not create any specific code on a machine to register a logical test case manager. Instead, it passes the IP and port information to the controller 128 and the latter handles the registration.

In one implementation, the machine manager supports three commands for the machine allocation functionality:
ReserveANumberOfMachines( . . . )
ReleaseReservedMachines( . . . )
NotifyWhenNewMachineBecomesAvailable( . . . )

The controller 128 is the control center of the test system. It collects information from the machine manager about available test case managers and SUTs in the system, manages the busy/free state of the SUTs, creates test case managers to run test cases, and manages the queue of test cases waiting to be run.

As described above, the user can select the test cases to run using the front end UI 122. When the user clicks the "RUN" button control on the TestRun page 154, the test case selection information is conveyed to the controller 128. A TestBatchID GUID that identifies the test execution run is automatically generated. That test execution instance is uniquely associated with the newly generated TestBatchID. A status data set is then added to the TestCaseStatus table. The TestBatchID-TestExecutionID is uniquely associated to that TestCaseStatus table and will serve as the key. The controller 128 polls the TestCaseStatus table and when new test cases are found, extracts from the table the information needed for a test case, such as the number of SUTs, the names of particular SUTs to use if specified, and the test case ID.

The controller 128 is also responsible for setting correct "states" for each test case. The states are:
Initializing—Test case hasn't been attempted yet.
Running—Test case is currently being run.
Pending—Test case has not yet started due to insufficient computer resources. The Testcase has been placed in a "pending list" by the controller and will be run as soon as sufficient resources become available.
Number of pending attempts
Pass—Test case has completed execution and has passed all tests
Fail—Test case has completed execution and has failed one or all tests The UI will also poll this table and render changes in the states as the status data become available.

For a test case or a suite of test cases to be executed, the controller 128 requests the machine manager 126 to provide a number of machines, including one test case manager and a plurality of SUTs. The TestBatch ID for the test run is passed to the machine manager 126 with the machine reservation request. The controller 128 can specify the particular types of machines it needs for the test case by including a list of restrictions or constraints with the request. The constraints include, for example, the CPU speed of the machine, the operating system, the types and versions of DLLs on the machine, etc. For instance, if a test is requiring a particular build number, the controller will pass the build number as a constraint.

In response to the request from the controller 128, the machine manager 126 searches the machine information database 138 for machines that meet the need of the controller. When a particular type of machine is requested by the controller, only those machines that meet the selection criteria will be returned. If a test case manager and the required number of SUTs are available, the machine manager 126 returns the IP addresses and ports for remoting channels of the test case manager and the SUTs. If no machines can be selected that satisfy selection criteria, a 'no matches' message is returned to the controller. If the requested machines are not currently available, the control can ask the machine manager to notify it when the machines become available.

At the end of the test case execution, the test case manager returns the list of machines it was able to successfully communicate with. The controller releases the SUTs and test case manager so they can be used in a future test run, and informs the machine manager that the test base manager and SUTs have been released.

When a machine is handed off to the controller, its name and the required port are passed down to the test case manager for test execution. These machines are reserved and will not be allocated to other controllers in the system until they are explicitly released by the controller. Once released, the machine manager makes the machine available for a future test run. When the test is done, the controller returns a list of the machines that completed the test. The machine manager then marks those machines as available for future tests.

To enable the controller 128 to run multiple test cases and receive new test cases, a test case queue 180 is used to manage and store test cases that are waiting for available machines upon which to run. If several test cases are chosen for execution and they cannot be executed, they are stored in a Pending List in the queue. If later the machine manager 126 has newly available SUTs, it notifies the controller 128. The newly available SUTs may have been freed up from a previously executing test case or may be new test units newly registered with machine manager. In response to the notification from the machine manager, the controller checks the Pending List to find test cases that can be executed with the newly available test machines.

Once the controller 128 is provided with the test case manager and SUTs for a test case (or a suite of test cases), it directs the test case manager to control the execution of the test case on the SUTs. To that end, the test case manager receives inputs from the controller for carrying out the test case. These inputs include:

The DLLs in which the test case is located. The DLL may contain multiple test cases for a particular feature.

The test case to be executed.

An array of machine information about the SUTs (e.g., as a set of .NET remotable ports).

In one embodiment, for each peer-to-peer application feature to be tested, there is one (or more) set of test case DLLs 188 (see FIG. 2) to be loaded on each SUT. The test case DLLs contain the particular cases to be run. The test case manager also enables the execution of EXE files, batch files, VB scripts, etc. through a generic execution DLL, which is also provided to the TCM by the controller 128.

To carry out the actions of the test case, a test object 190 is created on the test case manager 72 for a "TCM process". The purpose of this test object is to load the necessary DLLs and register the classes necessary for remote activation of the test case objects on the SUTs. To that end, the test case manager is given the definition of a TestCase class, which is an abstract class that all test case manager objects inherit from. It contains the common entry point method StartTest( ), which will be called by the controller 128 to start the testing of the test case. When the controller executes a test case, the test case object is instantiated on the SUTs, and the test case manager accesses the SUT objects using the object-remoting technology implemented in the network.

The basic functionality of a SUT is to open a safe environment on the computer for the tests to run. It does so by providing an object-remoting channel for communication and registering all objects needed by the test case manager. Once a SUT machine has registered with the machine manager 126, it is ready to be deployed by a test case manager. Apart from the TCM process, there is also a set of processes in each SUT. The SUT process loads the test case DLLs and exposes the remotable objects to the test case manager. Similar to the test object of the test case manager, a test object is created on each SUT. This test object of the SUT loads the DLLs and registers the classes for the test operations with the remoting framework of the network for remote activation of objects.

When the SUT is started up, it first opens a TCP remoting channel at an available port, and registers it with the object-remoting framework. It then registers three service objects (described below) and associates them with the remoting channel opened earlier. Next, it establishes communication with the machine manager 126, and sends information about the TCP port to the machine manager for registration and SUT validation purposes. It then waits until either it is used by the test case manager or it is further queried by the machine manager, or it exits the test system. It should be noted that the registered channels and objects are only available while the process that registered them is alive. When the process is terminated, all channels and objects registered by that process is automatically removed from the remoting service where they were registered.

In one implementation, each SUT hosts three service objects: a DLL loader, a log agent, and a manager object. The DLL loader 192 is primarily for the use of the test case manager and is hosted as a "singleton" object (i.e., only one instance of the object is persisted) on the SUT. There are two types of class libraries that need to be loaded on the test case manager and the SUT. The test case manager is responsible for controlling the loading of both these DLLs. First, the test case manager loads the TestCase.dll by calling a LoadDll( ) method of the DLL loader. The TestCase.dll includes the information pertaining to each test case. This includes, for instance, information on the type of the test (e.g., discovery, grouping, etc.). The test case manager then creates a test object on each of SUTs assigned to work with it on the test case. Once the test object is created, the test case manager calls LoadDll( ) to load the TestOperation DLLs.

After the test objects are created and the required DLLs are loaded on the respective SUTs, the test case manager can start the execution of the test case. As described above, each test case includes a "scripted" sequence of actions to be performed by the respective SUTs. The TCM object controls the execution of the test case going through the sequence of actions and calling, for each action, the test object on a corresponding SUT to perform that action.

In a preferred embodiment, a hybrid model is implemented offering both centralized and decentralized logging capabilities. On each SUT, a log agent (LA) collects all the logs from the actions performed by the test object under the remote control of the test case manager. It is the responsibility of the log agent to send the stream(s) of log data to the log database in the main database. Thus, logging occurs at the machine level and log data are passed up to the central database by the log agent. The event that triggers logs to be sent to the central server occurs on the client side. Log agents poll themselves at defined intervals (defined by the test run) and when the test-run-defined minimum number of logs is reached then the logs are sent to the SQL server. This relieves the log controller of the central log database from having to ping each machine to trigger the transfer of logs and omits the need to for the Log controller to monitor the status of the logs for each log agent. This delegation of logging responsibility becomes more important when there is a large number of log agents. Another event that triggers logs to be sent is at the end of a test run. Outstanding logs from all test machines will be sent as part of their release back to the available machine pool.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for performing steps for executing a test case for testing a peer-to-peer application, comprising:
   receiving a set of dynamic link library files containing a plurality of test functions, each test function capable of performing a test action;
   creating a test case having a sequence of test actions to be performed by multiple test units distributed on a network implementing a remoting framework for remote object activation;
   loading the dynamic link library files to the multiple test units;
   creating a remotely callable test object on each of the test units that is remotely callable via the remoting framework; and
   going through the sequence of actions of the test case and for each action in the sequence:
   identifying a test unit for performing said each action;
   calling, via the remoting framework, the test object of said identified test unit to invoke a test function of the dynamic link library files loaded to said identified test unit that performs said each action.

2. The computer-readable medium of claim 1, having further computer-executable instructions for performing the step of receiving a list identifying the test units participating in executing the test case.

3. A computer-readable medium having computer-executable instructions for performing steps for executing a test case for testing a peer-to-peer application, comprising:
   allocating a test case manager and a plurality of test units for executing the test case, the test case manager and test units being on a network implementing a remoting framework for remote object activation;
   providing a set of dynamic link library files, containing a plurality of test functions, and data identifying the test units to the test case manager, the test case having a sequence of distributed test actions to be performed by the test units and each test function of the plurality of test functions capable of performing a test action at a test unit;
   loading, by the test case manager, the dynamic link library files containing the test case to the test units;
   creating, by the test case manager, a remotely callable test object on each of the test units; and
   executing, by the test case manager, the the sequence of actions of the test case by
   identifying a test unit for performing each action;
   calling, via the remoting framework, the test object of said identified test unit to invoke a test function of the dynamic link library files loaded to said identified test unit that performs said each action.

4. The computer-readable medium of claim 3, having further computer-executable instructions for performing the step of presenting a user interface for a user to enter a selection of test cases for testing.

5. The computer-readable medium of claim 3, having further computer-executable instructions for performing the step of transmitting, by each test unit, log information regarding actions performed by said each test unit to a log database.

6. The computer-readable medium of claim 3, having further computer-executable instructions for performing the step of registering each of the test case manager and the test units with a machine manager.

7. The computer-readable medium of claim 6, wherein the step of allocating includes requesting the machine manager to select the test case manager and the test units for executing the test case.

8. The computer-readable medium of claim 3, having further computer-executable instructions for performing the step of presenting a user interface for a user to enter a selection of test cases to run.

9. The computer-readable medium of claim 8, having further computer-executable instructions for performing the steps of: receiving case selection criteria entered by a user through the user interface; searching a test case database for test cases meeting the case selection criteria.

10. A method of executing a test case for testing a peer-to-peer application, comprising:
    receiving a set of dynamic link library files containing a plurality of test functions, each test function capable of performing a test action;
    creating a test case having a sequence of test actions to be performed by multiple test units distributed on a network implementing a remoting framework for remote object activation;
    loading the dynamic link library files to the multiple test units;
    creating a remotely callable test object on each of the test units that is remotely callable via the remoting framework; and
    going through the sequence of actions of the test case and for each action in the sequence:
    identify a test unit for performing said each action;
    calling, via the remoting framework, the test object of said identified test unit to invoke a test function of the dynamic link library files that performs said each action.

11. The method of claim 10, further including the step of receiving a list identifying the test units for use in executing the test case.

12. A method of executing a test case for testing a peer-to-peer application, comprising:
    creating a set of dynamic link library files containing a plurality of test functions, each test function capable of performing a test action at a test unit;
    allocating a test case manager and a plurality of test units for executing the test case;
    providing a set of dynamic link library files, containing a plurality of test functions, and data identifying the test units to the test case manager, the test case having a sequence of distributed test actions to be performed by the test units and each test function of the plurality of test functions capable of performing a test action at a test unit;
    loading, by the test case manager, the dynamic link library files containing the test case to the test units;
    creating, by the test case manager, a remotely callable test object on each of the test units; and
    executing, by the test case manager, the sequence of actions of the test case by
    identifying a test unit for performing each action;
    calling, by the test case manager via a remoting framework, the test object of said identified test unit to invoke a test function of the dynamic link library files loaded to said identified test unit that performs said each action.

13. The method of claim 12, further including the step of presenting a user interface for a user to enter a selection of test cases for testing.

14. The method of claim 12, further including the step of transmitting, by each test unit, log information regarding actions performed by said each test unit to a log database.

15. The method of claim 12, further including the step of registering each of the test case manager and the test units with a machine manager.

16. The method of claim 15, wherein the step of allocating includes requesting the machine manager to identify the test case manager and the test units for executing the test case.

17. The method of claim 12, further including the step of presenting a user interface for a user to enter a selection of test cases to run.

18. The method of claim 17, further including the steps of: receiving case selection criteria entered by a user through the user interface; and searching a test case database for test cases meeting the case selection criteria.

19. A system for executing test cases for testing peer-to-peer applications, comprising:
- a plurality of dynamic link library files containing a plurality of test functions, each test function capable of performing a test action at a test unit;
- a plurality of test groups each including a test case manager and a plurality of test units distributed on a network implementing a remoting framework; and
- a controller for assigning test cases to the test groups, each test case having a sequence of a plurality of actions to be performed by multiple test units, each of the test case managers being programmed to receive a set of dynamic link library files of the plurality of dynamic link library files, the set of dynamic link library files containing a sequence of actions for a selected test case from the controller, load the dynamic link library files containing the selected test case to test units allocated for executing the selected test case, create a remotely callable test object on each of the allocated test units, and execute the sequence of actions of the selected test case by identifying for each action of the selected test case one of the allocated test units for performing said each action, and calling the test object of said identified test unit via the remoting framework to invoke a test function of the dynamic link library files loaded to said identified test unit that performs said each action.

20. The system of claim 19, further comprising a machine manager for registering the test case managers and test units and allocating the test base managers and test units for test cases upon requests of the controller.

21. The system of claim 19, further comprising a user interface for a user to enter a selection of test cases to be executed.

22. The system of claim 19, further comprising a searchable test case database containing information regarding available test cases.

23. The system of claim 19, further comprising a log database for containing log information regarding execution of test cases, and wherein each test unit has a log agent for transmitting log data for actions performed by said each test unit to the log database.

* * * * *